US007761282B2

(12) United States Patent
Alvey et al.

(10) Patent No.: US 7,761,282 B2
(45) Date of Patent: Jul. 20, 2010

(54) SYSTEM AND METHOD TO SIMULATE CONDITIONS AND DRIVE CONTROL-FLOW IN SOFTWARE

(75) Inventors: Walter Duke Alvey, San Jose, CA (US); Priya Baliga, San Jose, CA (US); Ping Li, San Jose, CA (US); Randy Mitchell Nakagawa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1236 days.

(21) Appl. No.: 11/303,236

(22) Filed: Dec. 16, 2005

(65) Prior Publication Data

US 2007/0143093 A1    Jun. 21, 2007

(51) Int. Cl.
*G06F 9/45* (2006.01)
(52) U.S. Cl. ......................................... 703/22; 717/135
(58) Field of Classification Search ................... 703/22; 717/135
See application file for complete search history.

(56) References Cited

U.S. PATENT DOCUMENTS

| 5,574,854 | A | * | 11/1996 | Blake et al. | 714/28 |
| 5,774,725 | A | * | 6/1998 | Yadav et al. | 717/135 |
| 5,854,930 | A | * | 12/1998 | McLain et al. | 717/139 |
| 6,014,513 | A | | 1/2000 | Voelker et al. | 395/703 |
| 2004/0128650 | A1 | | 7/2004 | Chamberlain | 717/124 |
| 2004/0133881 | A1 | | 7/2004 | Chamberlain et al. | 717/125 |
| 2005/0071126 | A1 | * | 3/2005 | Groz | 702/186 |

OTHER PUBLICATIONS

MATLAB Documentation Set, TheMathWorks, Inc., Dec. 9, 2004. http://web.archive.org/web/20041209010644/http://www.mathworks.com/access/helpdesk/help/techdoc/matlab.html.*
MATLAB Previous Releases: Releases through Release 14 Service Pack 3, The Mathworks, Inc.; released Sep. 1, 2005. <http://www.mathworks.com/products/new_products/previous_release_overview.html>.*
MATLAB Documentation, The Mathworks, Inc., last updated 2008. <http://www.mathworks.com/access/helpdesk/help/techdoc/matlab.html>.*
Dor et al., "Software Validation via Scalable Path-Sensitive Value Flow Analysis," ISSTA '04, Jul. 11-14, 2004, Boston, MA, USA, ACM 1-58113-820-2/04/0007, pp. 12-22.
Adrion et al., "Validation, Verification, and Testing of Computer Software," Computing Surveys, vol. 14, No. 2, Jun. 1982, pp. 159-192.
Devadas et al., "An Observability-Based Code Coverage Metric for Functional Simulation," ICCAD '96, 1063-6757/96 (IEEE).

* cited by examiner

*Primary Examiner*—Dwin M Craig
(74) *Attorney, Agent, or Firm*—VanLeeuwen & VanLeeuwen; Elissa Y. Wang

(57) ABSTRACT

A method, information handling system, and computer program product to simulate conditions in a software module, by identifying, in the software module, whether a simulation environment has been activated, encountering a simulation point in the software module, the simulation point including one or more simulation parameters, and in response to identifying that the simulation environment has been activated and the simulation point has been encountered: invoking a simulation module, the invoking including passing the simulation parameters to the simulation module, comparing, at the simulation module, the simulation parameters with one or more active simulation entries, and returning a simulated condition from the simulation module to the software module in response to the comparing.

25 Claims, 10 Drawing Sheets

SYSTEM AND METHOD TO SIMULATE CONDITIONS AND DRIVE CONTROL-FLOW IN SOFTWARE

BACKGROUND OF THE INVENTION

1. Technical Field

The present invention relates in general to a system and method for simulating software conditions. More particularly, the present invention relates to a system and method that simulates conditions, such as error conditions and results, that can alter control flow in an executable software module.

2. Description of the Related Art

As software is developed, it needs to be tested in various phases, including, for example, unit testing of each module, integration testing of related modules, function verification testing, system verification testing, etc. A complete test of a piece of software should ideally involve testing the flow of control in all correct conditions, as well as all possible error conditions. However, it is extremely difficult, if not impossible, to easily reproduce all possible conditions. For example, certain error conditions, such as a time-out condition from a server, require a complex testing environment. Code-paths representing unusual, but legal, conditions may be hard to reproduce. Due to the difficulty in reproducing and testing some obscure conditions, developers often test only a small subset of important, or easy to reproduce, errors, while the behavior of the software in response to all other errors remains untested. This is a liability to software companies, which then need to provide support and/or fixes to their customers as and when bugs are discovered.

One technique for testing software error handling is to manually reproduce errors, and test to see if the software behavior in response to these errors is per specification. However, this technique requires a considerable investment of time and effort to reproduce error conditions and then recover from the error. Also, as discussed above, some errors, such as server time-out errors, are difficult to reproduce. Another error handling testing technique is to modify function arguments, return codes, or parameters during run-time and thus create the error conditions of interest. A drawback to this approach is that a debuggable version of the executable software code needs to be available. Most software executables are not shipped in a debug-ready mode due to the large size of the debuggable version of the executable. Hence, this approach is often not available to solve customer problems at the customer's location. Also, this type of testing can not be automated. For each run of the test-case, the relevant variables must be manually modified through a debugger. Thus, this is typically a costly approach to testing.

Another testing technique, used during the development phase to test different code paths, is to hard-code variables in the source code in order to drive different code paths or branches of the code. This only works well during the development phase, and can not typically be automated, because it involves manual code changes and recompilation. Another approach to force different code paths is to change variables, arguments, etc. through the use of a debugger. However, as discussed above, this approach can not be automated, and also requires that a debuggable version of the executable code be available, which is often not the case at a customer site.

What is needed, therefore, is a system and method that reproduces errors and drives the control-flow in a software module in order to allow for more efficient and thorough testing of software systems.

SUMMARY

It has been discovered that the aforementioned challenges are resolved using a method that simulates conditions in a software module, by identifying, in the software module, whether a simulation environment has been activated, encountering a simulation point in the software module, the simulation point including one or more simulation parameters, and in response to identifying that the simulation environment has been activated and the simulation point has been encountered: invoking a simulation module, the invoking including passing the simulation parameters to the simulation module, comparing, at the simulation module, the simulation parameters with one or more active simulation entries, and returning a simulated condition from the simulation module to the software module in response to the comparing.

In one embodiment, the method includes retrieving the simulated condition from the first active simulation entry matching the simulation parameters, and deactivating the simulated condition from the first active simulation entry matching the simulation parameters after retrieving the simulation condition.

In another embodiment, the method includes reading the active simulation entries from a simulation file, wherein the deactivating further includes writing a deactivation flag corresponding to the first active simulation entry matching the simulation parameters.

In another embodiment the method includes retrieving, from a simulation file, an external program reference included in the first active simulation entry matching the simulation parameters, and executing an external program corresponding to the external program reference.

In another embodiment the method includes retrieving a return value resulting from the execution of the external program, and providing, from the simulation module to the software module, the return value as the simulated condition.

In another embodiment the method further provides that the encountered simulation point is in a function of the software module and one of the simulation parameters is a function identifier corresponding to the function. This embodiment further includes receiving the simulated condition at the function, wherein the simulated condition is a simulated return code, and returning the simulated return code to a code segment that called the function.

In another embodiment the method further provides that the encountered simulation point is in a function of the software module and one of the simulation parameters is a function identifier corresponding to the function. This embodiment further includes returning a "not simulated" code from the simulation module to the function in response to not locating an active simulation entry in response to the comparing, receiving, at the function, the "not simulated" code and, at the function: performing the function steps, and returning an actual return code resulting from the function steps to a code segment that called the function.

In another embodiment the method further provides that one of the simulation parameters is a variable identifier. This embodiment further includes receiving the simulated condition, wherein the simulated condition is a variable value, and setting a variable corresponding to the variable identifier equal to the variable value.

In another embodiment the method further provides that one of the simulation parameters is a variable identifier. This embodiment further includes receiving the simulated condition, wherein the simulated condition indicates that the variable identifier is not simulated, and setting a variable corresponding to the variable identifier using a program statement.

In another embodiment the method further provides that the software module is a compiled executable object module.

In another embodiment the method further provides that the software module is not operating in a debug environment.

In another embodiment, the aforementioned challenges are resolved using an information handling system capable of executing the methods described above. In yet another embodiment, the aforementioned challenges are resolved using a computer program product stored in a computer operable media, and containing instructions which, when executed by computer, cause the computer to execute the methods described above.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method, system, and computer program product that reproduces errors and other conditions, and drives the control-flow of code-paths through simulation. Such simulation can be performed repeatedly at runtime without the need for rebuilding the software. Scripts may be used to automate the process. Simulating executable software has several advantages. Some errors are difficult to recreate, and so being able to simulate the errors allows developers to recreate an error condition that may otherwise be difficult to recreate. Also, simulation allows errors to be simulated even after the software has been installed at a customer site, and without the use of a debugger or debuggable version of the executable code. The method, system, and computer program of the present invention also allow simulation to occur at some points, while normal processing will take place at other points. The ability to switch between simulation and normal processing is described more fully below.

Figure 1:
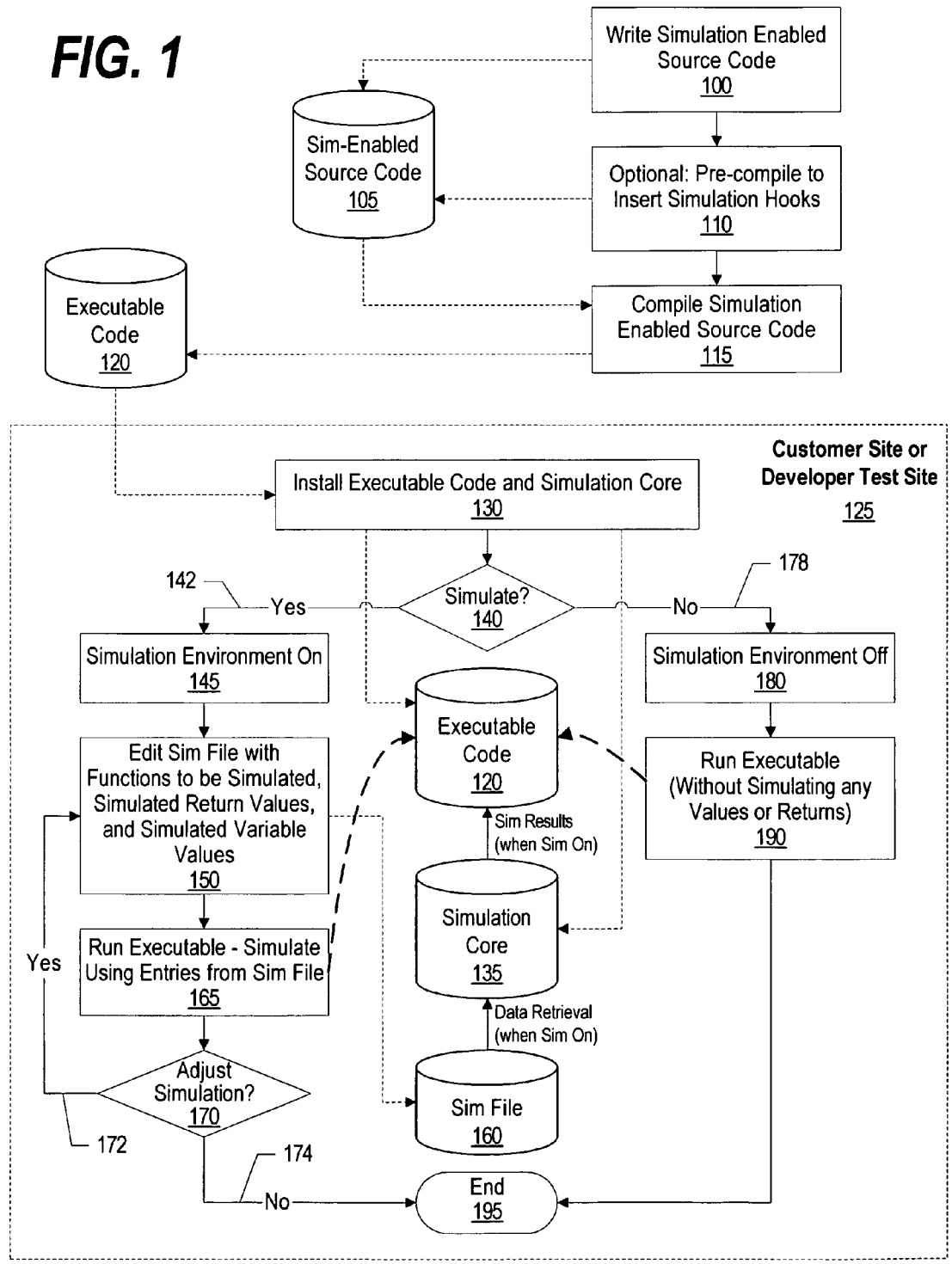
FIG. 1 is a system diagram showing the interaction of various components used to simulate software conditions.

FIG. 1 is a system diagram showing the interaction of various components used to simulate software conditions. A developer writes a software module, including source code that is simulation-enabled (step 100). The source code instructions that enable simulation to take place will vary depending on the source code itself and the desired simulation, as explained in further detail in FIGS. 2 through 8. The simulation-enabled source code 105 is stored in a storage area. As an option, the developer may choose to pre-compile to insert simulation hooks (step 110). Pre-compilation is used when, for example, a compiler inserts simulation hooks into the source code. The compiler may insert the simulation hooks at pre-defined places in the source code, such as before and/or after every function call, or at the beginning and/or end of every function. Simulation-enabled source code 105 is then compiled and stored as executable code 120 (i.e. a software module) (step 115). Those skilled in the art will understand that compiling may include multiple steps of compiling, linking, making, building, etc. in order to produce executable code 120.

Executable code 120, along with a simulation module, referred to as simulation core 135, is installed at customer site or developer test site 125 (step 130). Simulation core 135 contains the logic for driving the simulation, including, for example, the logic to replace variables and/or return codes of interest and thus to drive a specific control-flow through executable code 120. Note that simulation core 135 may be a stand-alone package or may be an integral part of the software module being tested.

A determination is made as to whether executable code 130 should be simulated (step 140). This determination may be made by a developer who is interested in testing the code, or by a service person at a customer site who needs to reproduce and resolve an error condition. If it is determined to perform simulation of executable code 120, decision 140 branches to "yes" branch 142, whereupon a simulation environment is activated (step 145). Those skilled in the art will understand that a simulation environment may be activated by setting a global variable, an environment variable, a switch, a setting in a configuration file, or by some other means.

Simulation file 160 is edited to include the particular functions to be simulated, simulated return variables, simulated variable values, and the like (step 150). Simulation file 160 may specify which function from which component should be simulated. Simulation file 160 may specify new values for arguments, such as return codes, error codes, local variables, global variables, function arguments, etc. Simulation file 160 may also contain paths/names of executable scripts, along with their parameters, if any. In the described embodiment, simulation file 160 may be created and edited at any time during the development, testing, or runtime process. Simulation file 160 allows a user to specify different entries and thus drive different code paths. Simulation file 160 also gives the user the ability to switch between simulation domains and "real" domains, as simulation file 160 can specify whether a particular call should be simulated (either through argument replacement or through the use of stubs), or if the regular production code should be used. Simulation file 160 may also contain more than one entry for a particular simulated call. As an example, a user may edit simulation file 160 to specify that the first call to a particular function use the production code (i.e. not be simulated), while the next call to be same function should simulate a particular error. Further details regarding the use of simulation file 160 are described throughout FIGS. 2 through 8 below. An example of a simulation file is also shown and described below, with reference to FIG. 9.

Executable code 120 is then executed, and as execution progresses, simulation occurs using entries from simulation file 160 (step 165). Simulation is explained more fully in FIGS. 2 through 8 below. After executable code 120 has executed, a determination is made as to whether or not the simulation needs to be adjusted and perhaps run again (decision 170). If it is determined to adjust the simulation, decision 170 branches to "yes" branch 172, whereupon processing continues at step 150. If, however, the simulation does not need to be adjusted (perhaps because the current simulation successfully reproduced an error or successfully drove a control-flow), then decision 170 branches to "no" branch 174, whereupon processing ends at 195.

Returning to decision 140, if it is determined that no simulation is necessary, decision 140 branches to "no" branch 178, whereupon a simulation environment is turned off (or left off if it was not previously set on) (step 180). Executable code 120 is then executed without simulating any values, return codes, or other conditions (step 190). Processing then ends at 195.

Figure 2:
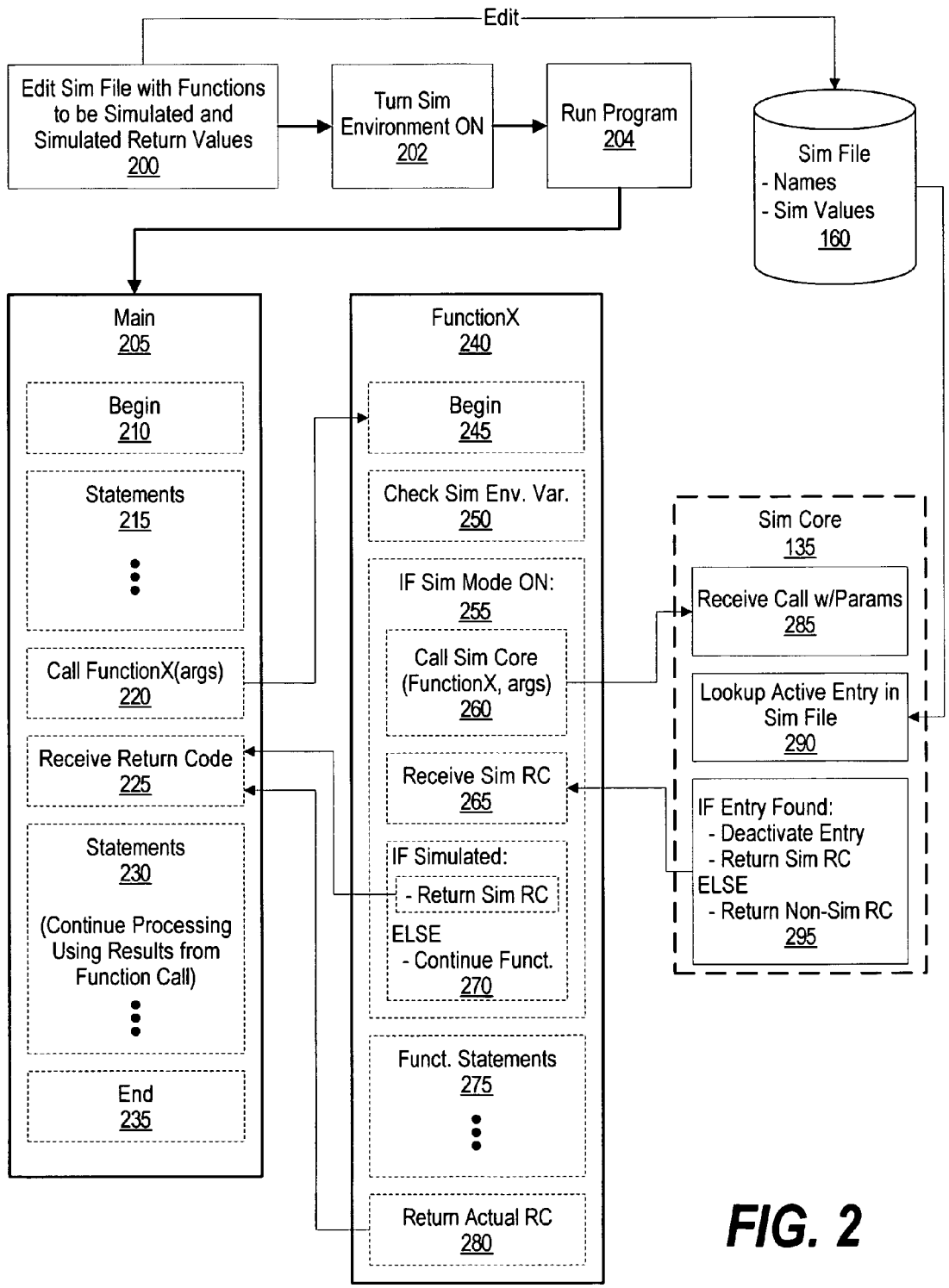
FIG. 2 is a diagram showing interaction between software and a function that is simulated when running in a simulation environment.

FIG. 2 is a diagram showing interaction between software and a function that is simulated when running in a simulation environment. Simulation file 160 is edited to include the names of the functions to be simulated, along with the simulated return values to be returned (step 200). The simulation environment is turned on, as described above with reference to FIG. 1 (step 202). The program then begins to execute (step 204). Main program 205 begins at 210 and processes statements (step 215) until a particular function call is reached (step 220). In the embodiment shown, FunctionX 240 is a function that may be simulated.

FunctionX 240 begins at 245 and checks the simulation environment variable to determine if the system is in simulation mode (step 250). Note that this check may be performed in various places in the code, and does not necessarily have to be checked at the beginning of FunctionX 240. In the described embodiment, a determination is made, based on the simulation environment variable, as to whether or not the simulation mode is on (step 255). If simulation mode is on, then FunctionX 240 calls simulation core 135 (step 260).

Simulation core 135 receives the call from FunctionX 240, including any parameters passed by FunctionX 240, such as the name of FunctionX and/or variable names to be simulated (step 285). Simulation core 135 reads simulation file 160 to determine if there are any active entries found for FunctionX 240 (step 290). In step 295, if an active entry is found in simulation file 160, the entry is deactivated (so that it is only processed once) and the simulated return code stored as part of the entry is returned to FunctionX 240. If simulation core 135 does not find an active entry for FunctionX 240 in simulation file 160, then a return code indicating that there is no entry found is returned.

FunctionX 240 receives the return code from simulation core 135 (step 265). This return code may be a simulated return code or a return code indicating that no simulation value exists. In step 270, if the return code is a simulated return code value, then the simulated return code is returned to main program 205. If the return code from simulation core 135 is a return code indicating that no simulation has taken place, then FunctionX 240 continues processing by executing functional statements (step 275). An actual return code, based on the functional statements, is then returned to main program 205 (step 280).

Main program 205 receives the return code from FunctionX 240 (step 225), and continues executing statements using the results received from FunctionX 240 (step 230). Processing then ends at 235.

Figure 3:
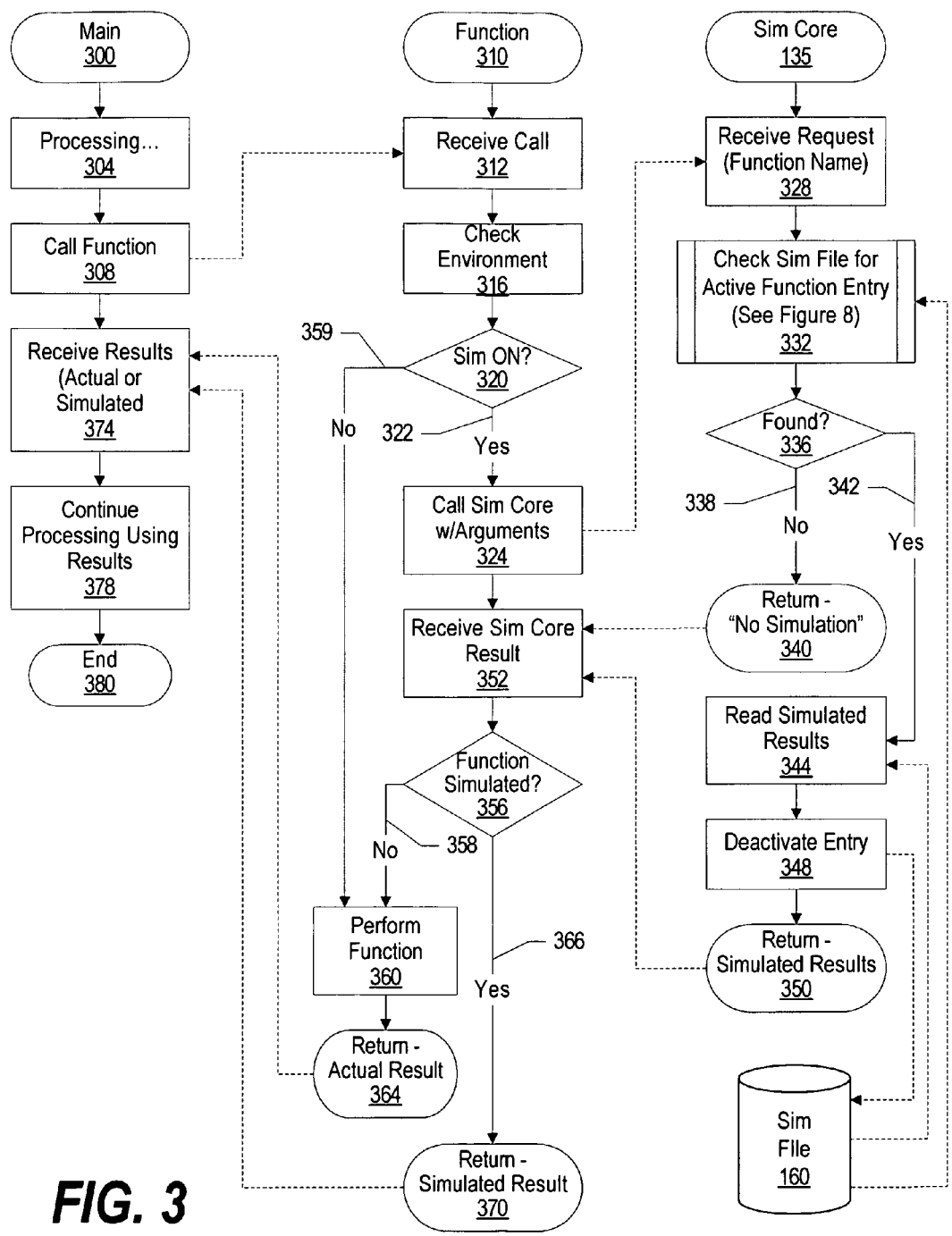
FIG. 3 is a first flowchart showing the steps taken during the interaction between software and a function shown in FIG. 2.

FIG. 3 is a first flowchart showing the steps taken during the interaction between software and a function shown in FIG. 2. Main program 300 begins processing at step 304. At step 308, the program makes a function call to function 310, which receives control (step 312). The function checks to see if a simulation environment has been activated (step 316). As discussed above, the simulation environment may be checked at various places in the code, and may be activated by setting a global variable, an environment variable, a switch, a setting in a configuration file, or by some other means. A determination is made as to whether or not the simulation environment is on, i.e. activated (decision 320). If the simulation environment is not activated, then decision 320 branches to "no" branch 359, whereupon processing continues at step 360. If, however, the simulation environment is activated, this means that a simulation point has been reached, and thus decision 320 branches to "yes" branch 322, whereupon a call is made to a simulation module, i.e. simulation core 135 (step 324).

Figure 8:
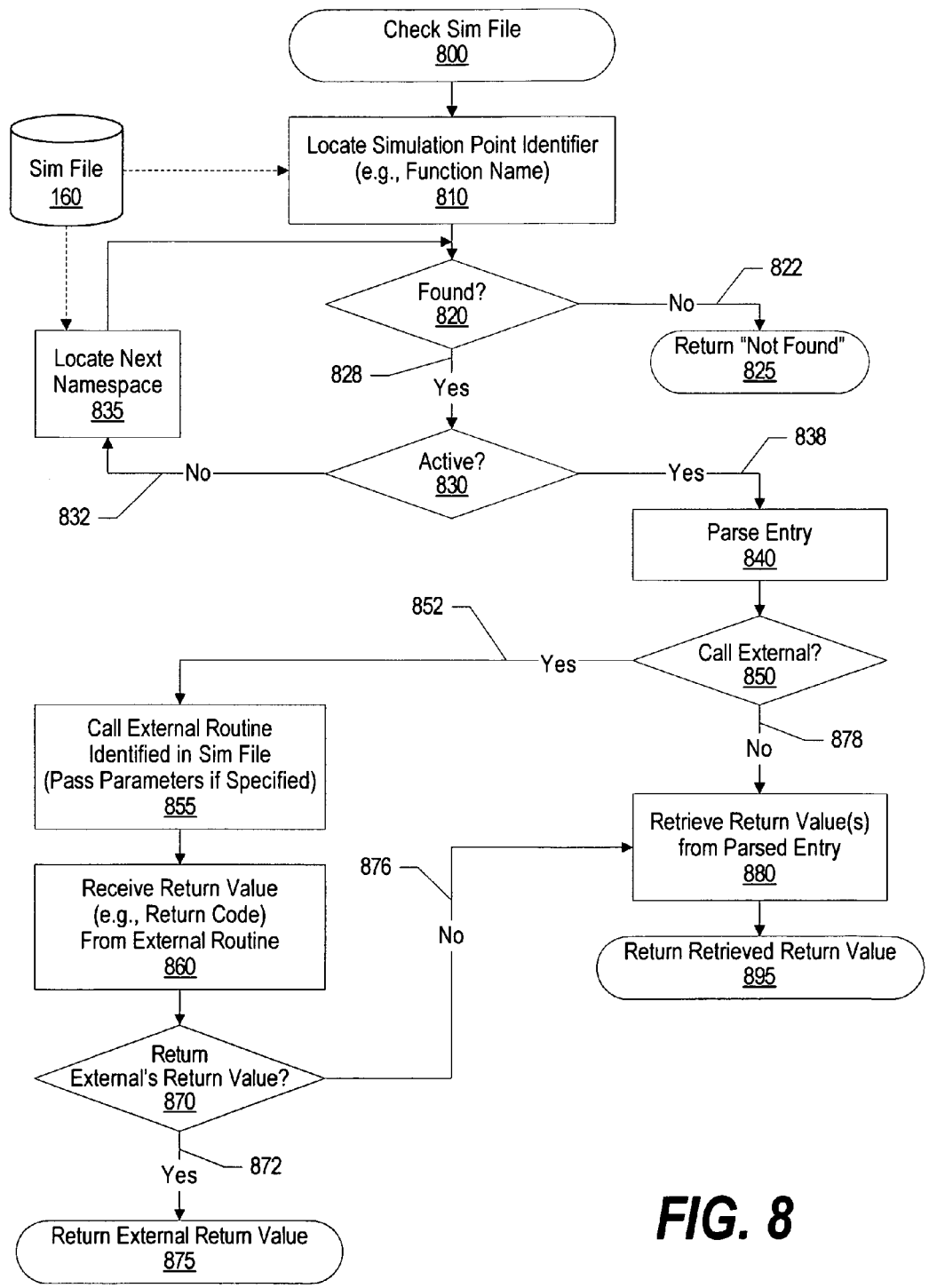
FIG. 8 is a flowchart showing the steps taken to check a simulation file to determine if a particular entry is currently being simulated.

Simulation core 135 receives the call from function 310, including an argument, such as the name of function 310 (step 328). The simulation core checks simulation file 160 for an active entry for function 310 (predefined process 332), as depicted in FIG. 8. A decision is made regarding whether or not an active entry is found (decision 336). If an active entry is found for function 310, then decision 336 branches to "yes" branch 342, whereupon the simulated results associated with the active entry are read from simulation file 160 (step 344). The active entry is then deactivated (step 348). An active entry may be deactivated, for example, by commenting out, or by deleting, the active entry in simulation file 160. An active entry may also be deactivated by setting a "deactivated flag" in the entry, by keeping track of the last executed entry via a pointer, or by some other type of control logic in the simulation file. The simulated results are then returned to function 310 (step 350).

Returning to decision 336, if no active entry is found in simulation file 160 for function 310, then decision 336 branches to "no" branch 338, whereupon a "no simulation" return code is returned to function 310 (step 340). A "no simulation" return code may be a pre-defined return code that indicates that no simulation was performed. Function 310 receives the return code from simulation core 135 (step 352). A determination is made, based on the return code, as to whether simulation was performed (decision 356). If the return code indicates that no simulation was performed, decision 356 branches to "no" branch 358, whereupon the actual statements of function 310 are executed (step 360) and an actual return code (i.e. not a simulated return code) is returned to main program 300 (step 364). If, however, a simulated return code was returned from simulation core 135 to function 310, then decision 356 branches to "yes" branch 366, whereupon the simulated result is returned to main program 300 (step 370).

Main program 300 receives the results from function 310 (step 374). These results may be actual or they may be simulated. In either case, main program 300 continues processing, using the received results (step 378), and processing ends thereafter at 380.

Figure 4:
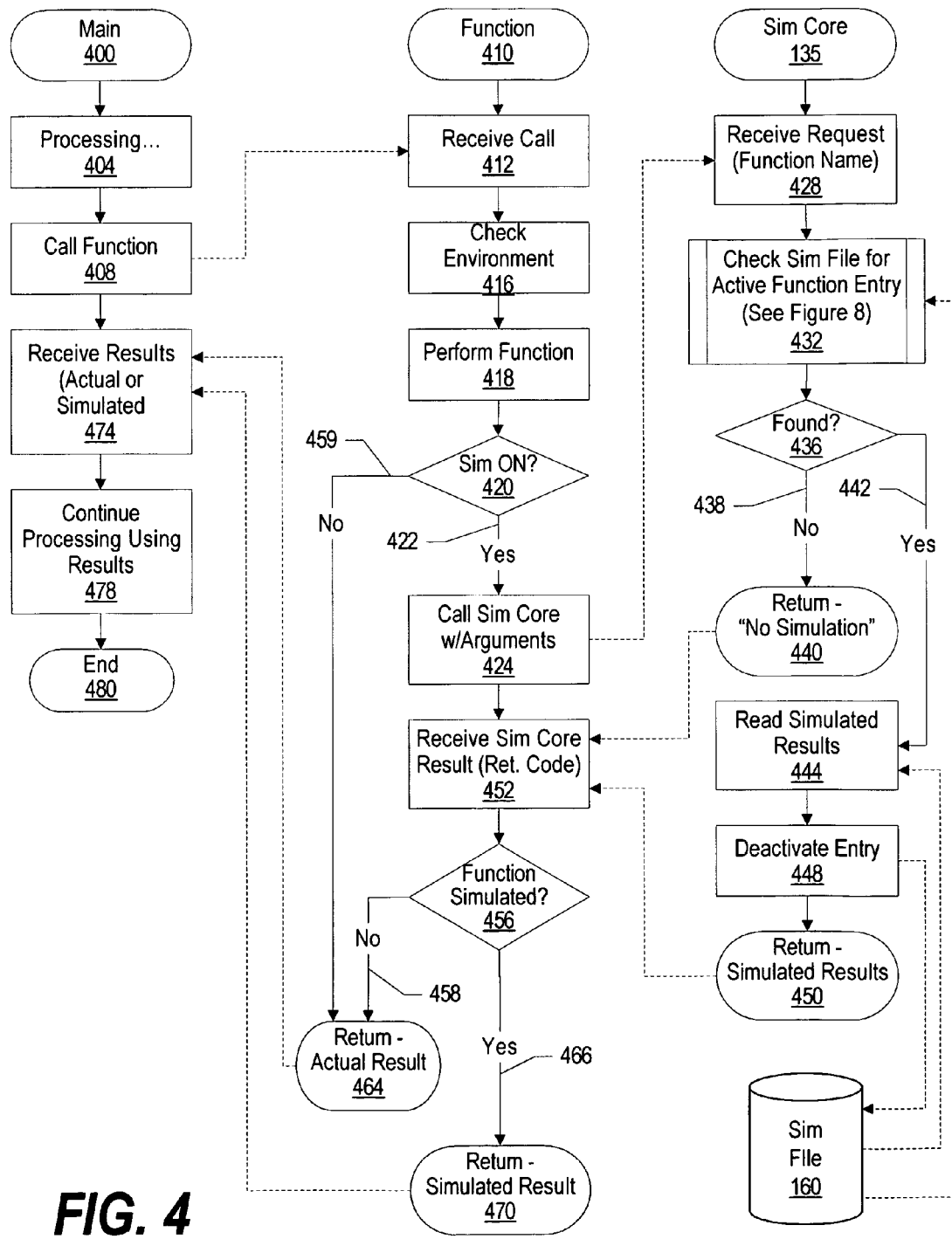
FIG. 4 is a second flowchart showing the steps taken during the interaction between software and a function shown in FIG. 2.

FIG. 4 is a second flowchart showing an alternate embodiment of the steps taken during the interaction between software and a function shown in FIG. 2. Main program 400 begins processing at step 404. At step 408, the program makes a function call to function 410, which receives control (step 412). The function checks to see if a simulation environment has been activated (step 416). As discussed above, the simulation environment may be checked at various places in the code, and may be activated by setting a global variable, an environment variable, a switch, a setting in a configuration file, or by some other means. Function 410 then performs its normal functioning, i.e. it executes the statements contained in its executable code, which typically produce a result or results (step 418).

After function 410 performs its normal processing, a determination is made as to whether or not the simulation environment is on, i.e. activated (decision 420). If the simulation environment is not activated, then decision 420 branches to "no" branch 459, whereupon processing continues at step 464. If, however, the simulation environment is activated, this means that a simulation point has been reached, and thus decision 420 branches to "yes" branch 422, whereupon a call is made to a simulation module, i.e. simulation core 135. Simulation core 135 receives the call from function 410, including an argument, such as the name of function 410 (step 428). The simulation core checks simulation file 160 for an active entry for function 410 (pre-defined process 432), as depicted in FIG. 8. A decision is made regarding whether or not an active entry is found (decision 436). If an active entry is found for function 410, then decision 436 branches to "yes" branch 442, whereupon the simulated results associated with the active entry are read from simulation file 160 (step 444). The active entry is then deactivated (step 448). An active entry may be deactivated, for example, by commenting out, or by deleting, the active entry in simulation file 160. An active entry may also be deactivated by setting a "deactivated flag" in the entry, by keeping track of the last executed entry via a pointer, or by some other type of control logic in the simulation file. The simulated results are then returned to function 410 (step 450).

Returning to decision 436, if no active entry is found in simulation file 160 for function 410, then decision 436 branches to "no" branch 438, whereupon a "no simulation" return code is returned to function 410 (step 440). A "no simulation" return code may be a pre-defined return code that indicates that no simulation was performed. Function 410 receives the return code from simulation core 135 (step 452). A determination is made, based on the return code, as to whether simulation was performed (decision 456). If the return code indicates that no simulation was performed, decision 456 branches to "no" branch 458, whereupon the results from step 418, i.e. the actual results, are returned to main program 400 (step 464). If, however, a simulated return code was returned from simulation core 135 to function 410, then decision 456 branches to "yes" branch 466, whereupon the simulated result is returned to main program 400 (step 470).

Main program 400 receives the results from function 410 (step 474). These results may be actual or they may be simulated. In either case, main program 400 continues processing, using the received results (step 478), and processing ends thereafter at 480.

Figure 5:
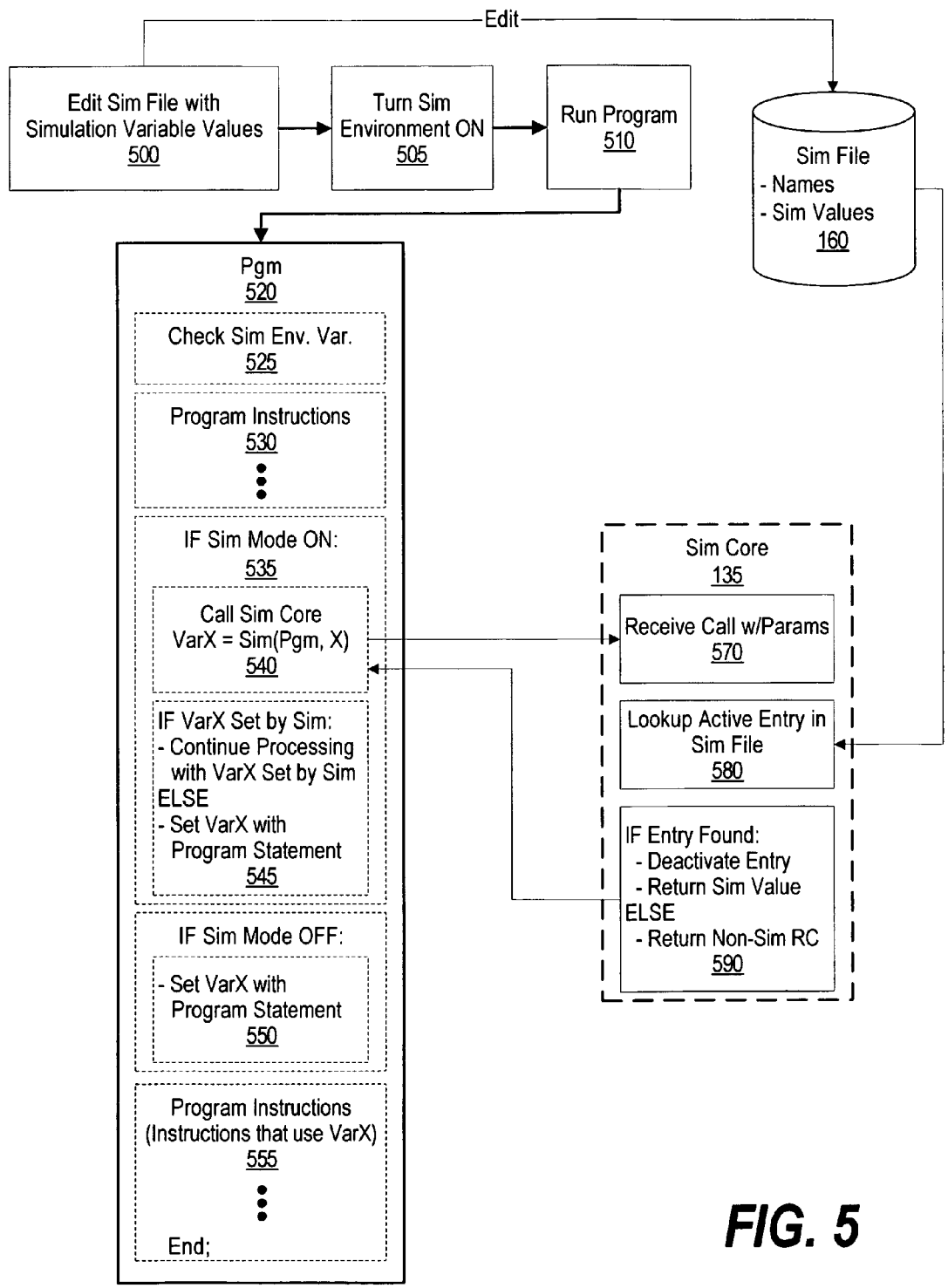
FIG. 5 is a diagram showing results of a software program being simulated when running in a simulation environment.

FIG. 5 is a diagram showing results of a software program being simulated when running in a simulation environment. Simulation file 160 is edited to include the names of the programs to be simulated, along with the simulated variable values to be returned (step 500). The simulation environment is turned on, as described above with reference to FIG. 1 (step 505). The program then begins to execute (step 510). Program 520 checks the simulation environment variable to see if simulation has been activated (step 525). Note that this check may be performed in various places in the code, and does not necessarily have to be checked at the beginning of Program 520. Program 520 then continues to process program instructions (step 530) until a simulation point is reached. In the described embodiment, a determination is made, based on the simulation environment variable, as to whether or not the simulation mode is on (step 535). If simulation mode is on, then program 520 calls a simulation module, referred to as simulation core 135, passing it the name of the program and the variable (in this example, variable X) which is to be simulated (step 540).

Simulation core 135 receives the call from program 520, including the parameters passed by program 520 (step 570). Simulation core 135 reads simulation file 160 to determine if there are any active entries found for program 520 (step 580). In step 590, if an active entry is found in simulation file 160, the entry is deactivated (so that it is only processed once) and the simulated variable value stored as part of the entry is returned to program 520. If simulation core 135 does not find an active entry for program 520 in simulation file 160, then a return code indicating that there is no entry found is returned.

Program 520 receives either the simulated variable value or the return code from simulation core 135. In step 545, if the variable has been simulated, processing continues by using the simulated variable value. On the other hand, if a return code from simulation core 135 is a return code indicating that no simulation has taken place, then program 520 continues processing by setting variable X using a program statement or statements. In step 550, if simulation mode is not activated, variable X is set by using a program statement or statements. Processing then continues with program instructions that use variable X, which may or may not be a simulated variable value (step 555).

Figure 6:
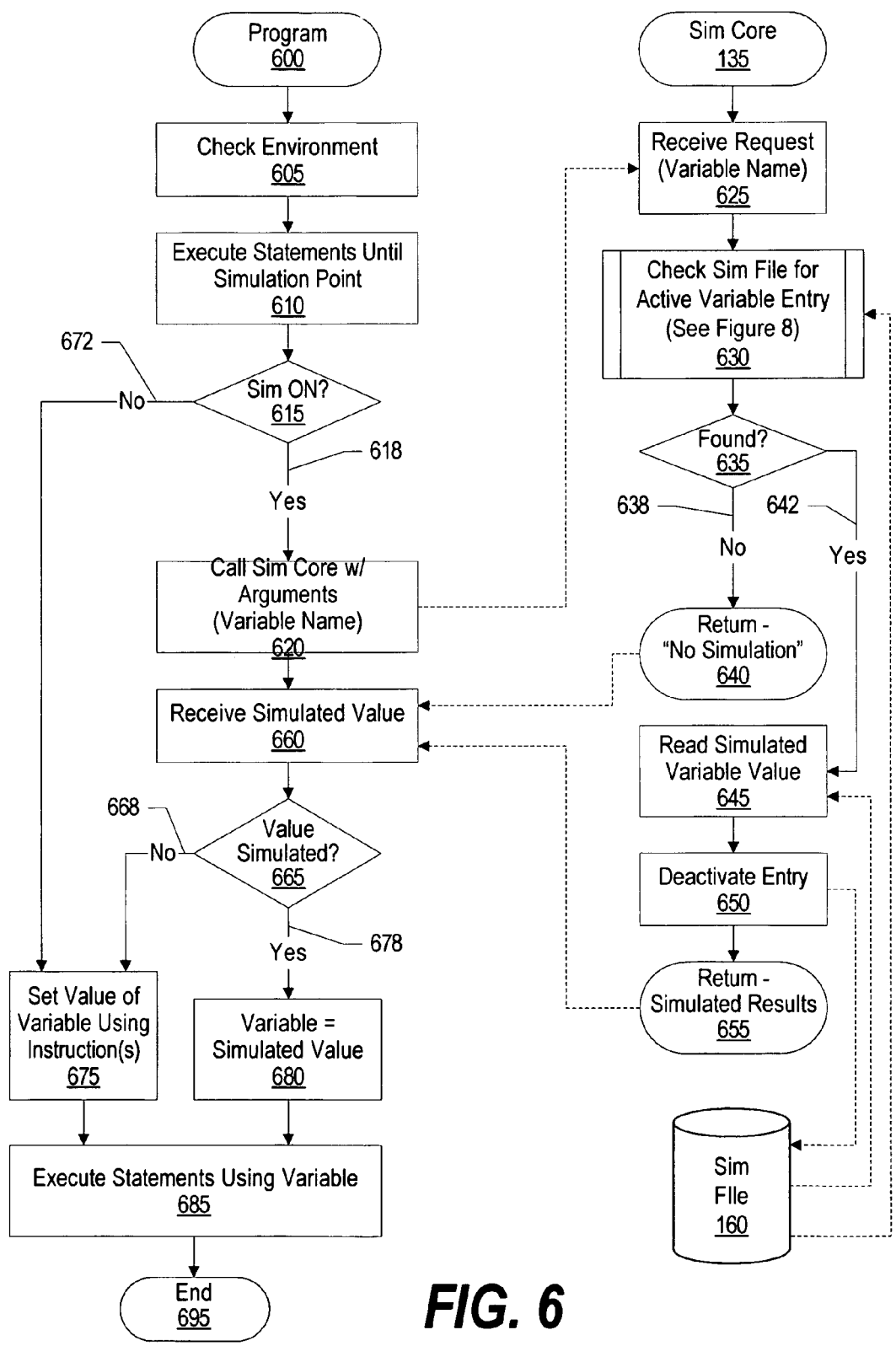
FIG. 6 is a first flowchart showing the steps taken during the simulation of the software shown in FIG. 5.

FIG. 6 is a first flowchart showing the steps taken during the simulation of the software shown in FIG. 5. Program 600 checks to see if a simulation environment has been activated (step 605). As discussed above, the simulation environment may be checked at various places in the code, and may be activated by setting a global variable, an environment variable, a switch, a setting in a configuration file, or by some other means. Processing continues until a simulation point is reached in the code (step 610). Note that a simulation point may be inserted in the code by a software developer or by a pre-compiler, as discussed above with reference to FIG. 1.

A determination is made as to whether the simulation environment is activated (decision 615). If the simulation environment is not activated, then decision 615 branches to "no" branch 672, whereupon processing continues at step 675. If, however, the simulation environment is on, then decision 615 branches to "yes" branch 618, whereupon a simulation module, i.e. simulation core 135 is called (step 620). As part of the call to simulation core 135, the variable name or names to be simulated are passed to simulation core 135. Simulation core 135 receives the request, including the variable names, from program 600 (step 625).

The simulation core checks simulation file 160 for an active entry for the variable(s) to be simulated (predefined process 630), as depicted in FIG. 8. A decision is made regarding whether or not an active entry is found (decision 635). If an active entry is found for the variable(s) to be simulated, then decision 635 branches to "yes" branch 642, whereupon the simulated variable value or values associated with the active entry are read from simulation file 160 (step 645). The active entry is then deactivated (step 650). An active entry may be deactivated, for example, by commenting out, or by deleting, the active entry in simulation file 160. An active entry may also be deactivated by setting a "deactivated flag" in the entry, by keeping track of the last executed entry via a pointer, or by some other type of control logic in the simulation file. The simulated variable value or values are then returned to program 600 (step 655).

Returning to decision 635, if no active entry is found in simulation file 160 for the variable(s) to be simulated, then decision 635 branches to "no" branch 638, whereupon a "no simulation" return code is returned to program 600 (step 640). A "no simulation" return code may be a pre-defined return code that indicates that no simulation was performed.

Program 600 receives the simulated variable value(s) or the "no simulation" return code from simulation core 135 (step 660). A determination is made, based on the value received, as to whether simulation was performed (decision 665). If the return code indicates that no simulation was performed, decision 665 branches to "no" branch 668, whereupon the value or values are set using actual instructions of program 600 (step 675). If, however, a simulated variable value or values were returned from simulation core 135 to program 600, then decision 665 branches to "yes" branch 678, whereupon the variable or variables to be simulated are set using the value(s) received from simulation core 135 (step 680). Program 600 then continues processing, using the variable values as set by either the actual instructions or by the simulation core (step 685). Processing then ends at 695.

Figure 7:
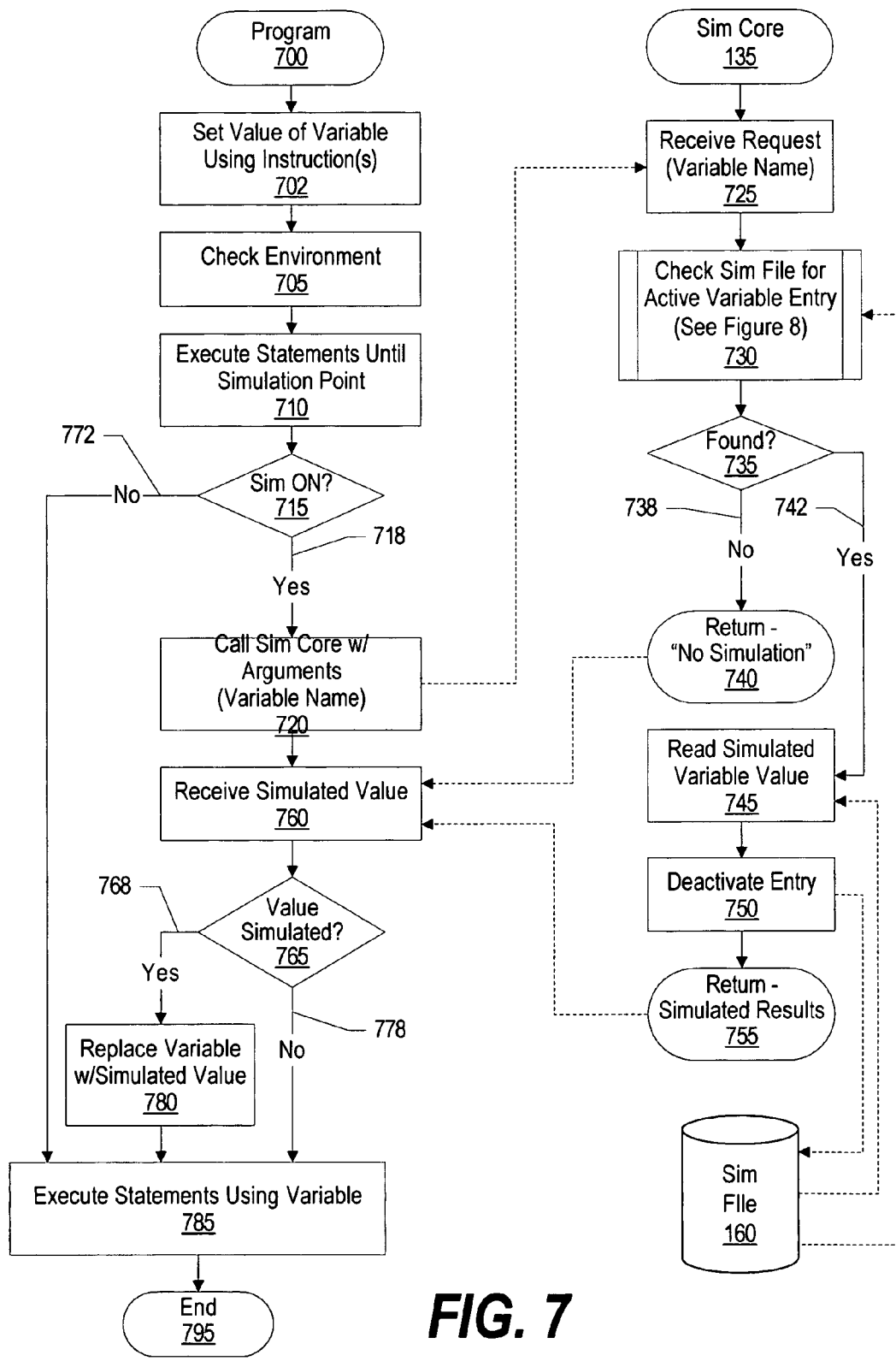
FIG. 7 is a second flowchart showing the steps taken during the simulation of the software shown in FIG. 5.

FIG. 7 is a second flowchart showing another embodiment of the steps taken during the simulation of the software shown in FIG. 5. Program 700 sets the value of a variable (or variables) using its regular, production code instruction (or instructions) (step 702). Program 700 then checks to see if a simulation environment has been activated (step 705). As discussed above, the simulation environment may be checked at various places in the code, and may be activated by setting a global variable, an environment variable, a switch, a setting in a configuration file, or by some other means. Processing continues until a simulation point is reached in the code (step 710). Note that a simulation point may be inserted in the code by a software developer or by a pre-compiler, as discussed above with reference to FIG. 1.

A determination is made as to whether the simulation environment is activated (decision 715). If the simulation environment is not activated, then decision 715 branches to "no" branch 772, whereupon processing continues at step 785. If, however, the simulation environment is on, then decision 715 branches to "yes" branch 718, whereupon a simulation module, i.e. simulation core 135 is called (step 720). As part of the call to simulation core 135, the variable name or names to be simulated are passed to simulation core 135. Simulation core 135 receives the request, including the variable names, from program 700 (step 725).

The simulation core checks simulation file 160 for an active entry for the variable(s) to be simulated (predefined process 730), as depicted in FIG. 8. A decision is made regarding whether or not an active entry is found (decision 735). If an active entry is found for the variable(s) to be simulated, then decision 735 branches to "yes" branch 742, whereupon the simulated variable value or values associated with the active entry are read from simulation file 160 (step 745). The active entry is then deactivated (step 750). An active entry may be deactivated, for example, by commenting out, or by deleting, the active entry in simulation file 160. An active entry may also be deactivated by setting a "deactivated flag" in the entry, by keeping track of the last executed entry via a pointer, or by some other type of control logic in the simulation file. The simulated variable value or values are then returned to program 700 (step 755).

Returning to decision 735, if no active entry is found in simulation file 160 for the variable(s) to be simulated, then decision 735 branches to "no" branch 738, whereupon a "no simulation" return code is returned to program 700 (step 740). A "no simulation" return code may be a pre-defined return code that indicates that no simulation was performed.

Program 700 receives the simulated variable value(s) or the "no simulation" return code from simulation core 135 (step 760). A determination is made, based on the value received, as to whether simulation was performed (decision 765). If the return code indicates that no simulation was performed, decision 765 branches to "no" branch 778, whereupon processing continues at step 785. If, however, a simulated variable value or values were returned from simulation core 135 to program 700, then decision 765 branches to "yes" branch 768, whereupon the variable or variables to be simulated are replaced using the value(s) received from simulation core 135 (step 780). Program 700 then continues processing (step 785), using the variable values as set by either the actual instructions (in step 702) or by the simulation core. Processing then ends at 795.

FIG. 8 is a flowchart showing the steps taken to check a simulation file to determine if a particular entry is currently being simulated. In the described embodiment, a simulation file may contain various types of information, depending on the nature of the information being simulated. For example, one type of simulation entry includes the name of a function being simulated, along with a simulated return code for that function. Note that two possible embodiments of function return code simulation are shown above, with reference to FIGS. 2 through 4. Another type of simulation entry contains the name of a variable or variables being simulated, along a simulated value for each simulated variable. Optionally, both a function name and variable name(s), along with simulation values for the variables, may be stored as a simulation entry. Two possible embodiments of variable simulation are shown above, with reference to FIGS. 5 through 7.

Another type of simulation entry includes calls to an external program. For example, when simulation is activated, it may be desired to call an external routine to set up a particular environment or to perform certain tasks. When a simulation point is reached, the software module being executed (i.e. a program or function) calls the simulation core, passing it a function name. When the simulation core checks the simulation file, the entry for the particular function name may include the name of an external routine to be called. This external routine is then executed, and then control is passed back to the program or function that called the simulation core. Parameters may or may not be passed from the program that called the simulation core and vice versa.

Some error conditions may not be reproducible through error-code replacement alone, and the ability to invoke external functions may be useful in order to reproduce these error conditions. An appropriate environment may need to be created before reproducing certain errors, as subsequent functions in the calling chain may expect certain errors only in specific environments. One approach is to include logic in the simulation core to run an optional environment setup function (specified as an optional field in the simulation file) before reproducing errors. The simulation file could contain the location, name, and (optional) parameters of the environment set-up function that ensures that the appropriate conditions are present (and, if not, set them) before simulating the error. The ability to invoke an external function is also useful when testing in a multi-threaded environment. One thread may be simulated, and then a script may be executed to replace the simulation file so that the next thread sees a different version of the configuration file.

In some cases, a function name and a variable name, along with a simulation value for a variable, may be stored as a simulation entry, and the entry may also include an external function. For example, the following entry may be stored as a simulation entry:

FuncX,Var1=1,RC=10, /user/priya/delete_file, filename

In this example, FuncX identifies the function being simulated. Var1 is to be simulated with a value of one, and the return code for FuncX is to be simulated with a return code of 10. A script given by the path /user/priya/delete_file is to be executed, and the filename is passed to the script to be the file that is deleted.

Returning to FIG. 8, to locate a particular simulation entry, processing begins at 800, whereupon a simulation point identifier is located in simulation file 160 (step 810). The simulation point identifier may be a function name, variable name, a combination of function name and variable name, or any other indicator that identifies a simulation entry. A determination is made regarding whether the simulation point identifier is found (decision 820). If an entry is not found for the simulation point identifier, then decision 820 branches to "no" branch 822, whereupon a "not found" (or "no simulation") return code is returned (step 825). If, however, an entry is found for the simulation point identifier, decision 820 branches to "yes" branch 828, whereupon a further determination is made regarding whether the entry is active (decision 830). It is possible to have more than one simulation entry for a particular function and/or variable. For example, there may be three entries for a particular function in the simulation file. The first entry may include a successful return code, the second entry may include a particular error return code, and the third entry may include a different error return code. This allows a simulation to be performed where the first time a function is called, it completes successfully, but the second and third time the function is called, it results in two different errors. For example, when testing database code, the first "fetch" may differ from subsequent "fetches." The first fetch determines which block is to be fetched, while all subsequent fetches get the data from the predetermined block. Several customer issues may correspond to non-first fetches. Using more than one simulation entry for a function allows the first fetch call to proceed with no simulation, and then subsequent fetches can be simulated with various simulated error return codes.

After each entry in the simulation file is processed, it is marked "inactive" so that the next time the function is simulated, the next active entry is the entry that is used for the simulation. A simulation entry may be marked as "inactive" in a variety of ways, for example, by commenting out the simulation entry line or by changing the first character of the simulation entry to indicate that it is no longer "active."

If it is determined that the entry is not active, then decision 830 branches to "no" branch 832, whereupon the next simulation point identifier is located (step 835) and processing continues at decision 820. If, however, it is determined that the simulation entry is active, decision 830 branches to "yes" branch 838, whereupon the entry is parsed (step 840). A determination is made regarding whether an external program is to be called (decision 850). The external program could be used to perform more involved simulation, or to set up an environment or do some other processing. If it is determined that an external program is not to be called, then decision 850 branches to "no" branch 878, whereupon the simulated value(s) is retrieved from the parsed simulation entry (step 880). This simulated value will typically be a simulated return code or a simulated variable value or values. The retrieved simulation value is then returned at 895.

Returning to decision 850, if it is determined to call an external program, then decision 850 branches to "yes" branch 852, whereupon the external routine specified in the simulation file is called (step 855). If parameters have been specified, either by the software module that called the simulation core, or in the simulation entry, then those parameters are passed to the external routine. A return value, such as a return code, is received from the external routine (step 860). A determination is made regarding whether this return value is to be returned to the software module (decision 870). This may be the case when the external routine has performed simulation and has returned a simulated return value. If the return value is to be returned to the software module, then decision 870 branches to "yes" branch 872 whereupon the external return value is returned at 875. If the return value from the external routine is not to be returned to the software module, then decision 870 branches to "no" branch 876 whereupon the simulation value from the parsed entry (if there is a simulation value in the parsed entry) is obtained (step 880). This value is returned at 895.

Figure 9:
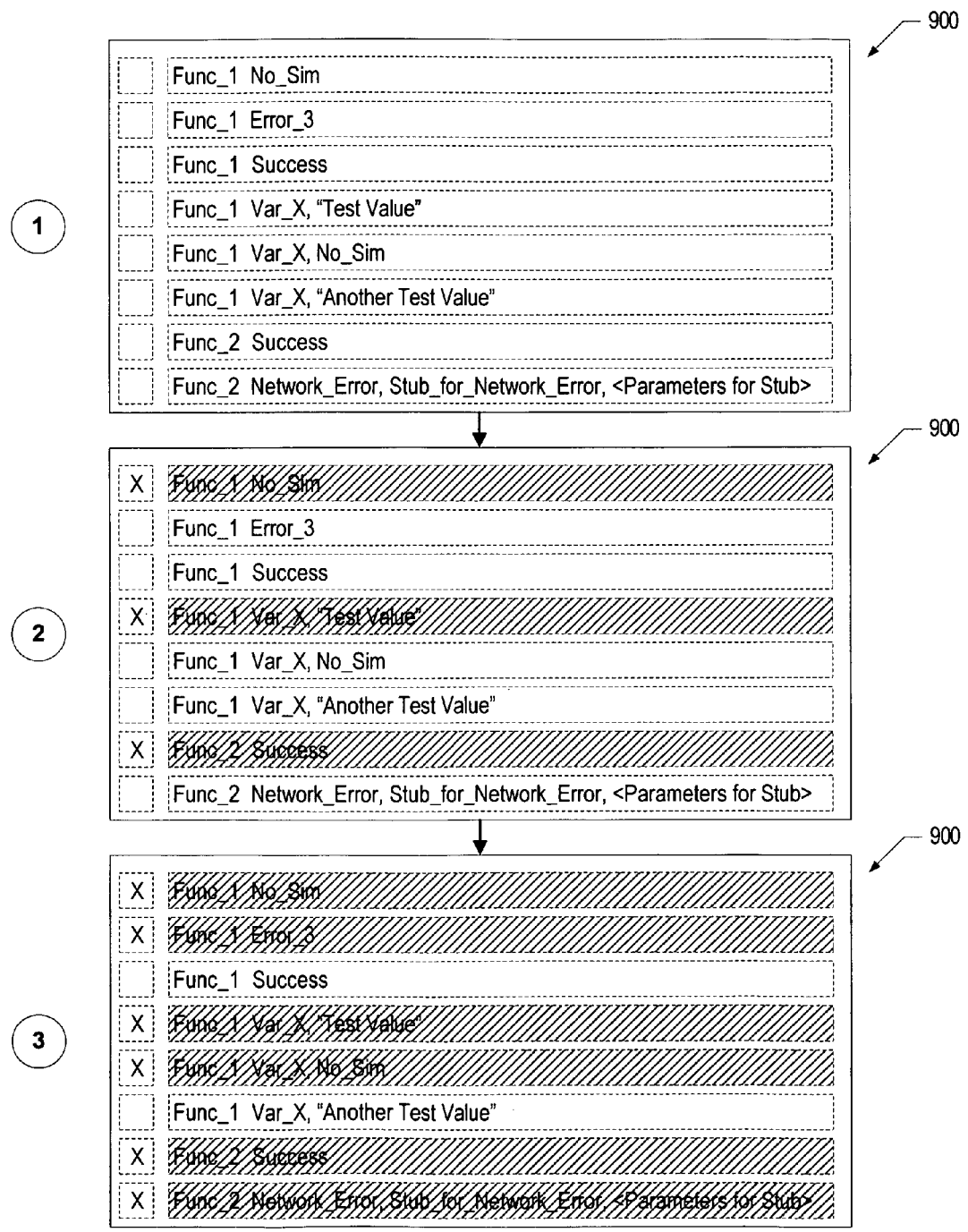
FIG. 9 is a diagram showing entries in a simulation file being marked as deactivated after being used to simulate conditions in a software program.

FIG. 9 is a diagram showing entries in a simulation file being marked as deactivated after being used to simulate conditions in a software program. Simulation file 900 is shown in three iterations. The first iteration shows simulation file 900 before any simulation has taken place. Simulation file 900 contains three simulation entries for Func_1. The first time Func_1 is called, the simulation core is to return a value of "No_Sim." In the described embodiment, a return value of "No_Sim" indicates that the Func_1 should proceed with its normal processing, for this iteration. This is similar to the situation where the simulation core does not find a simulation entry for Func_1. Note that in future iterations, the return value of Func_1 may be simulated. Also, in this iteration, if there are other simulation points in Func_1, for example, if there are variables that are simulated, that simulation will still take place. The return value of "No_Sim" simply means that no simulation is to be performed for this particular simulation point, and should not affect any other simulation points. The second time Func_1 is called, the simulation core is to return a simulated error code indicating that Error_3 has occurred. The third time that Func_1 is called, the simulation core is to return a simulation return code indicating that Func_1 completed successfully (in other words, a simulated return code indicating no error).

Simulation file 900 also contains three entries for Var_X found in Func_1. The first time that Var_X is to be simulated, the simulation core is to return a simulated value of "Test Value" for Var_X. The second time that Var_X is to be simulated, the simulation core is to return a simulated value of "No_Sim" for Var_X. This indicates that the value of Var_X is not to be simulated during this iteration, but, rather that Func_1 should calculate the value of Var_X using its normal production code statements. The third time that Var_X is to be simulated, the simulation core is to return a simulated value of "Another Test Value" for Var_X.

Simulation file 900 further contains two simulation entries Func__2. The first time that Func__2 is called, the simulation core is to return a simulated return code indicating that Func__2 has completed successfully. The second time that Func__2 is called, an external program is to be called. The external program is to simulate a network error, by calling a stub program (Stub_For_Network_Error), using parameters stored in the simulation entry. The simulated return code, "Network_Error" is also stored in the simulation entry, and is the simulated return code that is to be returned to the software module.

The second iteration of simulation file 900 shows simulation file 900 after Func__1 and Func__2 have both been called once. The first simulation entry for Func__1, Func__1 Var_X, and Func__2 are now marked as "inactive," so they will not be used again during this simulation. In the described embodiment, the entries are marked "inactive" by putting an "x" in a location preceding the entry. Another option would be to comment out the entries after they have been used.

The third iteration of simulation file 900 shows simulation file 900 after Func__1 and Func__2 have each been called twice. The first two entries for Func__1, Func__1 Var_X, and Func__2 are now marked as "inactive."

As described above, the simulation file may be used to drive a variety of code paths. Simulation entries may be used to simulate both error and success conditions in any combination and for any number of calls. Some simulation entries may indicate that no simulation is to be performed in that iteration. Simulation entries may optionally use stubs, and if so, parameters may or may not be specified for the stubs. For very large simulation files, a script may be used to generate the simulation file. For example, there may be hundreds, or even thousands, of places within a software module where a connection loss may occur. A script may be used to generate a simulation file with a random number of entries for successful connections and then insert a simulation entry for a lost connection error. The script could be re-run many times, each time inserting the connection loss error at a different point in the simulation file.

Using the method, system, and/or computer product of the present invention allows a tester to utilize test suites that test different errors in different areas of a product without having to recompile the code or rewrite/recompile the test suite. Only the simulation file needs to be changed to specify which features and/or functions should be simulated and which should execute using the "real" (i.e. normal, production) code. This could potentially save a great deal of time for a tester, as a test suite can be used to exercise different functions simply by using different simulation files. For example, a tester may first run the product using an empty configuration file, so that no simulation occurs and all functions execute their normal code. Next, the tester could test various return code conditions by using a simulation file, or files, that cause some functions to be simulated while other functions use their "real" code. Also, as described above, the tester could then test combinations of errors for different functions by using a configuration file that specifies various combinations of functions and simulated return codes and/or variable values.

The method, system, and computer product of the present invention are also useful for testing concurrency between processes. Such testing is difficult to reproduce, because it is difficult to predict or enumerate all possible points where an error in one process could affect other concurrently running processes. Using the approach described above, testers can inject different, although predictable, errors into a stress test environment, and verify the robustness of the concurrent processes.

Figure 10:
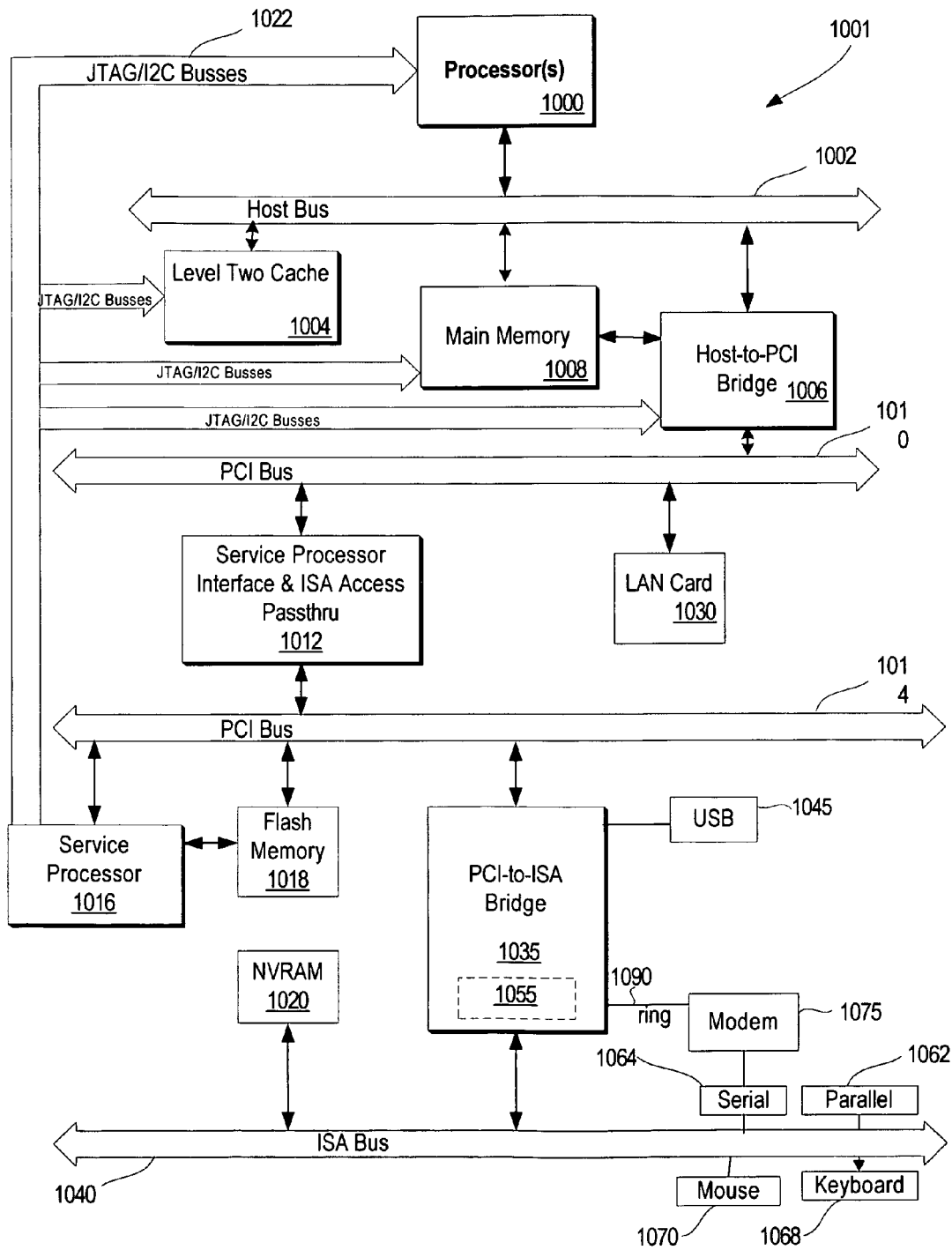
FIG. 10 is a block diagram of a computing device capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 1075 is connected to serial port 1064 and PCI-to-ISA Bridge 1035.

While the computer system described in FIG. 10 is capable of executing the processes described herein, this computer system is simply one example of a computer system. Those skilled in the art will appreciate that many other computer system designs are capable of performing the processes described herein.

While the information handling system described in FIG. 10 is capable of executing the processes described herein, this design is simply one example of a computer system design. Those skilled in the art will appreciate that many other computer system designs are capable of performing the processes described herein.

One of the preferred implementations of the invention is an application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for simulating conditions in a software module, said method comprising:
   executing the software module on a processor;
   identifying, by the processor, whether a simulation environment has been activated in the software module;
   encountering, by the processor, a simulation point in the software module, the simulation point including one or more simulation parameters, wherein the encountered simulation point is in a function of the software module and wherein one of the simulation parameters is a function identifier corresponding to the function;
   in response to identifying that the simulation environment has been activated and the simulation point has been encountered:
      invoking a simulation module, the invoking comprising passing the simulation parameters to the simulation module;
      comparing, at the simulation module, the simulation parameters with one or more active simulation entries, the active simulation entries stored in a simulation file, wherein each active simulation entry includes a simulated condition;
      in response to the comparing locating an active simulation entry, retrieving a first simulated condition from a first active simulation entry matching the simulation parameters and returning the first simulated condition from the simulation module to the software module;
      in response to the comparing not locating an active simulation entry, performing the following:
         returning a "not simulated" code from the simulation module to the function; and
         receiving, at the function, the "not simulated" code and, at the function, performing the function steps and returning an actual return code resulting from the function steps to a code segment that called the function.

2. The method of claim 1, further comprising:
   retrieving, from the simulation file, an external program reference included in the first active simulation entry; and
   executing an external program corresponding to the external program reference.

3. The method of claim 2, further comprising:
   retrieving a return value resulting from the execution of the external program; and
   providing, from the simulation module to the software module, the return value as the first simulated condition.

4. The method of claim 1, further comprising:
   receiving the first simulated condition at the function, wherein the first simulated condition is a simulated return code; and
   returning the simulated return code to the code segment that called the function.

5. The method of claim 1, wherein one of the simulation parameters is a variable identifier, the method further comprising:
   receiving the first simulated condition, wherein the first simulated condition is a variable value; and
   setting a variable corresponding to the variable identifier equal to the variable value.

6. The method of claim 1, wherein one of the simulation parameters is a variable identifier, the method further comprising:
   receiving the first simulated condition, wherein the first simulated condition indicates that the variable identifier is not simulated; and
   setting a variable corresponding to the variable identifier using a program statement.

7. The method of claim 1, wherein the software module is a compiled executable object module.

8. The method of claim 1, wherein the software module is not operating in a debug environment.

9. An information handling system comprising:
   one or more processors;
   a memory accessible by the processors;
   a storage device accessible by the processors; and
   a simulation tool for simulating conditions in a software module, the simulation tool being effective to:
      identify, in the software module, whether a simulation environment has been activated;
      encounter a simulation point in the software module, the simulation point including one or more simulation parameters, wherein the encountered simulation point is in a function of the software module and wherein one of the simulation parameters is a function identifier corresponding to the function;
      in response to identifying that the simulation environment has been activated and the simulation point has been encountered:

invoke a simulation module, the invoking comprising passing the simulation parameters to the simulation module;

compare, at the simulation module, the simulation parameters with one or more active simulation entries, the active simulation entries stored in a simulation file, wherein each active simulation entry includes a simulated condition;

in response to the comparing locating an active simulation entry, retrieve a first simulated condition from a first active simulation entry matching the simulation parameters and return the first simulated condition from the simulation module to the software module;

in response to the comparing not locating an active simulation entry, perform the following:
return a "not simulated" code from the simulation module to the function; and
receive, at the function, the "not simulated" code and, at the function, perform the function steps and return an actual return code resulting from the function steps to a code segment that called the function.

10. The information handling system of claim 9, wherein the simulation tool is further effective to:
retrieve, from the simulation file, an external program reference included in the first active simulation entry; and
execute an external program corresponding to the external program reference.

11. The information handling system of claim 10, wherein the simulation tool is further effective to:
retrieve a return value resulting from the execution of the external program; and
provide, from the simulation module to the software module, the return value as the first simulated condition.

12. The information handling system of claim 9, the simulation tool further effective to:
receive the first simulated condition at the function, wherein the first simulated condition is a simulated return code; and
return the simulated return code to the code segment that called the function.

13. The information handling system of claim 9, wherein one of the simulation parameters is a variable identifier, the simulation tool further effective to:
receive the first simulated condition, wherein the first simulated condition is a variable value; and
set a variable corresponding to the variable identifier equal to the variable value.

14. The information handling system of claim 9, wherein one of the simulation parameters is a variable identifier, the simulation tool further effective to:
receive the first simulated condition, wherein the first simulated condition indicates that the variable identifier is not simulated; and
set a variable corresponding to the variable identifier using a program statement.

15. The information handling system of claim 9, wherein the software module is a compiled executable object module.

16. The information handling system of claim 9, wherein the software module is not operating in a debug environment.

17. A computer program product stored on a computer operable media, the computer operable media containing instructions for execution by a computer, which, when executed by the computer, cause the computer to implement a method for simulating conditions in a software module, the method comprising:

identifying, in the software module, whether a simulation environment has been activated;

encountering a simulation point in the software module, the simulation point including one or more simulation parameters, wherein the encountered simulation point is in a function of the software module and wherein one of the simulation parameters is a function identifier corresponding to the function;

in response to identifying that the simulation environment has been activated and the simulation point has been encountered:

invoking a simulation module, the invoking comprising passing the simulation parameters to the simulation module;

comparing, at the simulation module, the simulation parameters with one or more active simulation entries, the active simulation entries stored in a simulation file, wherein each active simulation entry includes a simulated condition;

in response to the comparing locating an active simulation entry, retrieving a first simulated condition from a first active simulation entry matching the simulation parameters and returning the first simulated condition from the simulation module to the software module;

in response to the comparing not locating an active simulation entry, performing the following:
returning a "not simulated" code from the simulation module to the function; and
receiving, at the function, the "not simulated" code and, at the function, performing the function steps and returning an actual return code resulting from the function steps to a code segment that called the function.

18. The computer program product of claim 17, wherein the method further comprises:
retrieving, from the simulation file, an external program reference included in the first active simulation entry; and
executing an external program corresponding to the external program reference.

19. The computer program product of claim 18, wherein the method further comprises:
retrieving a return value resulting from the execution of the external program; and
providing, from the simulation module to the software module, the return value as the first simulated condition.

20. The computer program product of claim 17, the method further comprising:
receiving the first simulated condition at the function, wherein the first simulated condition is a simulated return code; and
returning the first simulated return code to the code segment that called the function.

21. The computer program product of claim 17, wherein one of the simulation parameters is a variable identifier, the method further comprising:
receiving the first simulated condition, wherein the first simulated condition is a variable value; and
setting a variable corresponding to the variable identifier equal to the variable value.

22. The computer program product of claim 17, wherein one of the simulation parameters is a variable identifier, the method further comprising:
receiving the first simulated condition, wherein the first simulated condition indicates that the variable identifier is not simulated; and setting a variable corresponding to the variable identifier using a program statement.

23. The computer program product of claim 17, wherein the software module is a compiled executable object module.

24. The computer program product of claim 17, wherein the software module is not operating in a debug environment.

25. A computer-implemented method for simulating conditions in a software module, said method comprising:
- executing the software module on a processor;
- identifying, by the processor, whether a simulation environment has been activated in the software module;
- encountering, by the processor, a simulation point in the software module, the simulation point including one or more simulation parameters, wherein one of the simulation parameters is a variable identifier;
- in response to identifying that the simulation environment has been activated and the simulation point has been encountered:
  - invoking a simulation module, the invoking comprising passing the simulation parameters to the simulation module;
  - comparing, at the simulation module, the simulation parameters with one or more active simulation entries, the active simulation entries stored in a simulation file, wherein each active simulation entry includes a simulated condition;
  - in response to the comparing, retrieving a first simulated condition, wherein the first simulated condition indicates that the variable identifier is not simulated;
  - setting a variable corresponding to the variable identifier using a program statement; and
  - returning the first simulated condition from the simulation module to the software module.

* * * * *